US007734053B2

(12) United States Patent
Suzuki et al.

(10) Patent No.: US 7,734,053 B2
(45) Date of Patent: Jun. 8, 2010

(54) ENCODING APPARATUS, ENCODING METHOD, AND COMPUTER PRODUCT

(75) Inventors: Masanao Suzuki, Kawasaki (JP); Masakiyo Tanaka, Kawasaki (JP); Yoshiteru Tsuchinaga, Fukuoka (JP); Miyuki Shirakawa, Fukuoka (JP); Takashi Makiuchi, Fukuoka (JP)

(73) Assignee: Fujitsu Limited, Kawaskai (JP)

( * ) Notice: Subject to any disclaimer, the term of this patent is extended or adjusted under 35 U.S.C. 154(b) by 1108 days.

(21) Appl. No.: 11/390,054

(22) Filed: Mar. 27, 2006

(65) Prior Publication Data

US 2007/0127585 A1 Jun. 7, 2007

(30) Foreign Application Priority Data

Dec. 6, 2005 (JP) ............................ 2005-352470

(51) Int. Cl.
*H04R 5/00* (2006.01)
*H04N 7/12* (2006.01)
*G10L 19/02* (2006.01)
*G10L 19/00* (2006.01)

(52) U.S. Cl. .................... 381/23; 375/240.03; 704/229; 704/230

(58) Field of Classification Search .................. 381/23, 381/1, 11; 375/240.03, 240.01, 240.27; 704/229, 704/230, 216, 203, 222; 700/94
See application file for complete search history.

(56) References Cited

U.S. PATENT DOCUMENTS 6,501,797 B1 * 12/2002 van der Schaar et al. .................... 375/240.12
6,904,091 B1 * 6/2005 Schelkens et al. ...... 375/240.03
6,982,762 B1 * 1/2006 Hui ......................... 348/405.1
7,079,581 B2 * 7/2006 Noh et al. .............. 375/240.16
7,388,912 B1 * 6/2008 Katsavounidis et al. 375/240.02
7,512,181 B2 * 3/2009 Boice et al. ............ 375/240.26
2004/0252758 A1 * 12/2004 Katsavounidis et al. .. 375/240.2
2005/0157884 A1 7/2005 Eguchi
2006/0171456 A1 * 8/2006 Kwon .................... 375/240.03
2007/0081587 A1 * 4/2007 Raveendran et al. ..... 375/240.1
2009/0010559 A1 * 1/2009 Inagaki ....................... 382/253

FOREIGN PATENT DOCUMENTS

JP 2001-255892 9/2001
WO 01/43503 6/2001

OTHER PUBLICATIONS

European Search Report dated Jun. 25, 2009, from the corresponding European Application.

* cited by examiner

*Primary Examiner*—Curtis Kuntz
*Assistant Examiner*—Hai Phan
(74) *Attorney, Agent, or Firm*—Katten Muchin Rosenman LLP

(57) ABSTRACT

An encoding apparatus compresses a stereo signal using a sum signal and a difference signal of a left component signal and a right component signal of the stereo signal. The encoding apparatus includes a calculating unit that calculates complexity of the sum signal and complexity of the difference signal; a setting unit that sets, based on the complexity, an allocation rate of bits to be allocated in quantizing the sum signal and the difference signal; and a quantizing unit that quantizes the sum signal and the difference signal based on the allocation rate.

9 Claims, 14 Drawing Sheets

ENCODING APPARATUS, ENCODING METHOD, AND COMPUTER PRODUCT

CROSS-REFERENCE TO RELATED APPLICATIONS

This application is based upon and claims the benefit of priority from the prior Japanese Patent Application No. 2005-352470, filed on Dec. 6, 2005, the entire contents of which are incorporated herein by reference.

BACKGROUND OF THE INVENTION

1. Field of the Invention

The present invention relates to a technology for encoding a stereo signal to compress an audio signal.

2. Description of the Related Art

Conventionally, as a scheme of encoding a frequency spectrum obtained by orthogonally transforming an audio signal such as those of voice and music, an advanced audio coding (AAC) that is an audio standard of ISO/IEC 13818-7 has been used. The AAC is applied to a surface digital radio broadcasting, and a mid-side (MS) stereo encoding is further applied to improve efficiency of compression of the stereo signal.

FIG. 12 is a schematic for illustrating an encoding procedure in the MS stereo encoding. An MS stereo encoding apparatus 1200 shown in FIG. 12 first orthogonally transforms a left channel audio signal (L) by an L-orthogonally transforming unit 1201 and orthogonally transforms a right channel audio signal (R) by an R-orthogonally transforming unit 1202. The L and R after the transformation are input into an MS stereo transforming unit 1203 and the MS stereo transforming unit 1203 generates respectively a sum signal M (M=(L+R)/2) and a difference signal S (S=(L−R)/2) from the input L and R. The sum signal M is encoded by a sum signal quantizer 1204 (code word 1). The difference signal S is encoded by a difference signal quantizer 1205 (code word 2).

In MS stereo encoding, in the MS stereo transforming unit 1203, when L and R are highly correlated with each other, that is, L and R are highly similar to each other, the electric power of the difference signal S is smaller than that of the sum signal M. Therefore, the efficiency of the encoding can be improved by decreasing the number of encoding bits of the difference signal S and increasing the number of encoding bits of the sum signal M.

In addition to the transformation by the MS stereo encoding, as a method of improving the efficiency of encoding, for example, Japanese Patent Application Laid-Open Publication No. 2001-255892 discloses a technique that transforms adaptively a difference signal into a monaural state. FIG. 13 is schematic for explaining an adaptive transformation into the monaural state. Charts 1310 and 1320 show the spectrums of audio signals L and R. Charts 1330 and 1340 show the spectrums of a sum signal M and a difference signal S generated using the L and R. A spectrum 1311 of the L and a spectrum 1321 of the R are transformed respectively into a spectrum 1331 of the sum signal M and a spectrum 1341 of the difference signal S.

In the transformation from the L and R into the sum signal M and the difference signal S, a signal at a frequency "f" is noted. In the monaural transformation, similarity between the L and the R is obtained, and when the similarity between the L and the R is high, the difference signal S is silenced or is deformed into a signal having small amplitude. When the similarity between the L and the R is high, the number of bits of the difference signal S is decreased to zero because the difference signal S becomes S=(L−R)/2≈0. That is, for the spectrum 1341 representing the difference signal S, the signal at the frequency f becomes zero and the bits for this signal is allocated to the signal at the frequency f of the spectrum 1331 representing the sum signal M. Therefore, the number of bits of the sum signal M is increased and distortion of the audio signal associated with the quantization can be reduced.

However, in the surface digital radio broadcasting, the bit rate allocated to sound is very low as 32 kilo bits per second (kbps) to 64 kbps to realize high-quality sound (music) at the quality level of a CD and video images at around 330 kbps in total. Therefore, in the conventional MS stereo encoding, sound quality is degraded due to shortage of the number of quantization bits.

If the adaptive transformation into the monaural state is applied, in a band of the difference signal S being zero, which is a band that has been transformed into the monaural state, the number of quantization bits of the difference signal S can be decreased. However, in a band that can not be transformed into the monaural state, the number of quantization bits of the difference signal S can not be decreased. Therefore, sufficient sound quality can not be obtained under the condition of a low bit rate.

SUMMARY OF THE INVENTION

It is an object of the present invention to at least solve the above problems.

An encoding apparatus according to one aspect of the present invention compresses a stereo signal using a sum signal and a difference signal of a left component signal and a right component signal of the stereo signal. The encoding apparatus includes a calculating unit configured to calculate complexity of the sum signal and complexity of the difference signal; a setting unit configured to set, based on the complexity, an allocation rate of bits to be allocated in quantizing the sum signal and the difference signal; and a quantizing unit configured to quantize the sum signal and the difference signal based on the allocation rate.

An encoding method according to another aspect of the present invention is a method in which a stereo signal is compressed using a sum signal and a difference signal of a left component signal and a right component signal of the stereo signal. The encoding method includes calculating complexity of the sum signal and complexity of the difference signal; setting, based on the complexity, an allocation rate of bits to be allocated in quantizing the sum signal and the difference signal; and quantizing the sum signal and the difference signal based on the allocation rate.

A computer-readable recording medium according to still another aspect of the present invention stores therein a computer program for realizing an encoding method according to the above aspect.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings.

Figure 1:
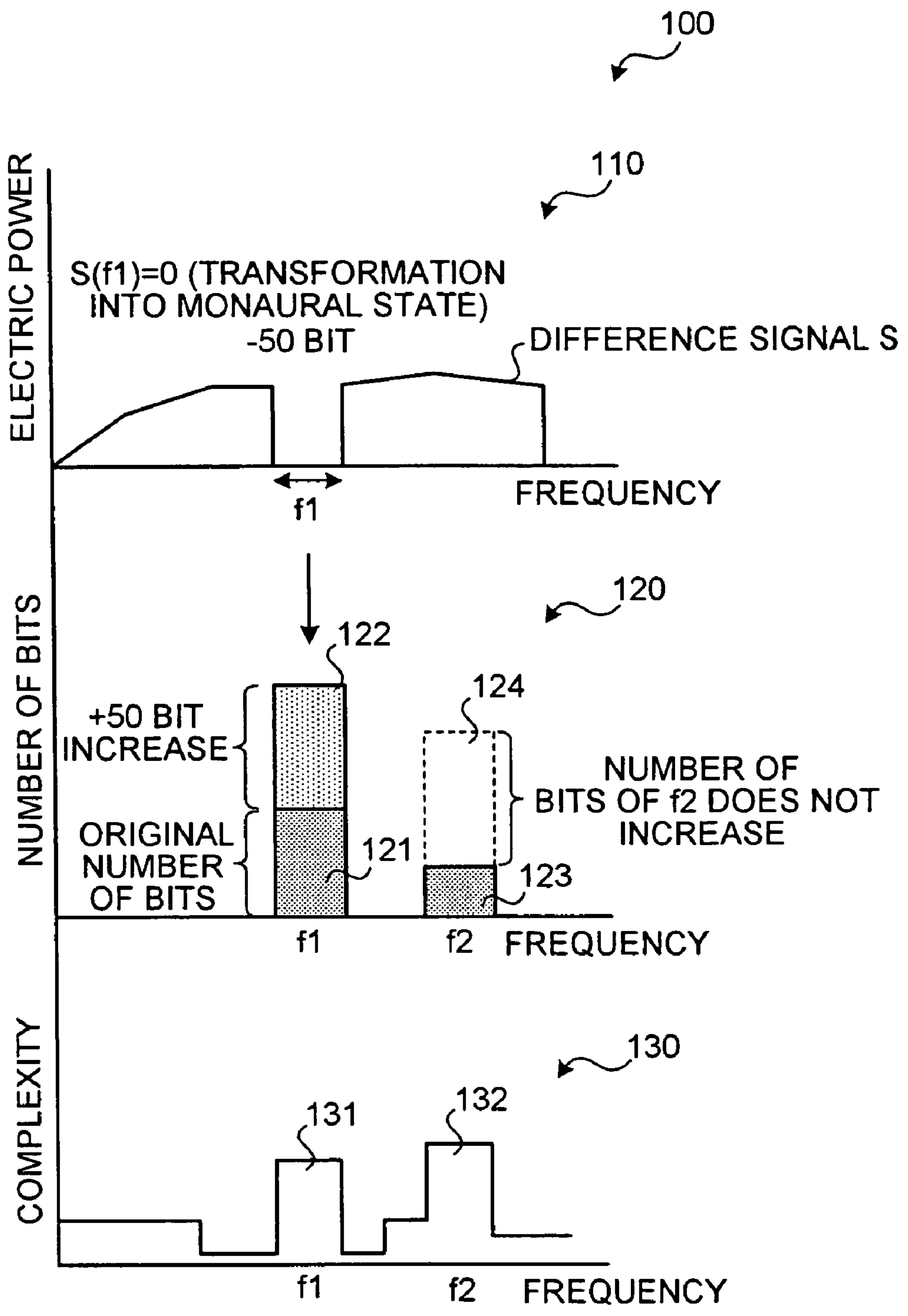
FIG. 1 is a schematic for explaining ordinary transformation into the monaural state.

FIG. 1 is a schematic for explaining ordinary transformation into the monaural state. In a chart 100 shown in FIG. 1, a chart 110 represents an electric power of the difference signal S, a chart 120 represents the number of bits of a sum signal M, and a chart 130 represents complexity of the sum signal M.

The chart 110 represents the electric power for each frequency of the difference signal S with an abscissas axis representing the frequency and an ordinate axis representing the electric power. The difference signal S at the frequency f1 is transformed into a signal with the electric power of zero by the transformation into the monaural state. Due to this transformation, the number of bits of the difference signal S is decreased (−50 bits in the example of the chart 110).

The chart 120 represents the number of quantization bits for each frequency of the sum signal M with the abscissas axis representing the frequency and the ordinate axis representing the number of bits after the sum signal M is quantized. As represented in the chart 110, the bits (−50 bits) of the difference signal S decreased by the transformation into the monaural state is newly added as a number of bits 122 (+50 bits) to an original number of bits 121 at the frequency f1.

The chart 130 represents complexity for each frequency of the sum signal M with the abscissas axis representing the frequency and the ordinate axis representing the complexity. In an example depicted in the chart 130, it can be seen that complexity 131 of the sum signal M at the frequency f1 and complexity 132 of the sum signal M at a frequency f2 are high. As described referring to the chart 120, the sum signal at the frequency f1 is added with the number of bits 122 that is the decreased portion of the difference signal S at the frequency f1. Therefore, the quantization error of the sum signal M at the frequency f1 can be reduced and improvement of the sound quality can be expected.

However, in the normal transformation into the monaural state, a signal to be added with a number of bits is limited to a difference signal at a frequency for which the number of bits has been decreased. A number of bits 123 of the sum signal at the frequency f2 having complexity as high as that at the frequency f1 is not newly added with a number of bits (for example, a number of bits 124 indicated by a dotted line). Therefore, the quantization errors of the sum signal at the frequency f2 can not be reduced and the sound quality can not be improved.

In the present invention, a number of bits that has been decreased by transforming the difference signal S into the monaural state are allocated corresponding to the complexity of each signal within the same frame regardless of the frequency. As specific allocation methods, a method of allocating the number of bits corresponding to the complexity of the sum signal M, and a method of allocating the number of bits corresponding to the complexity of the difference signal S are used.

Figure 2:
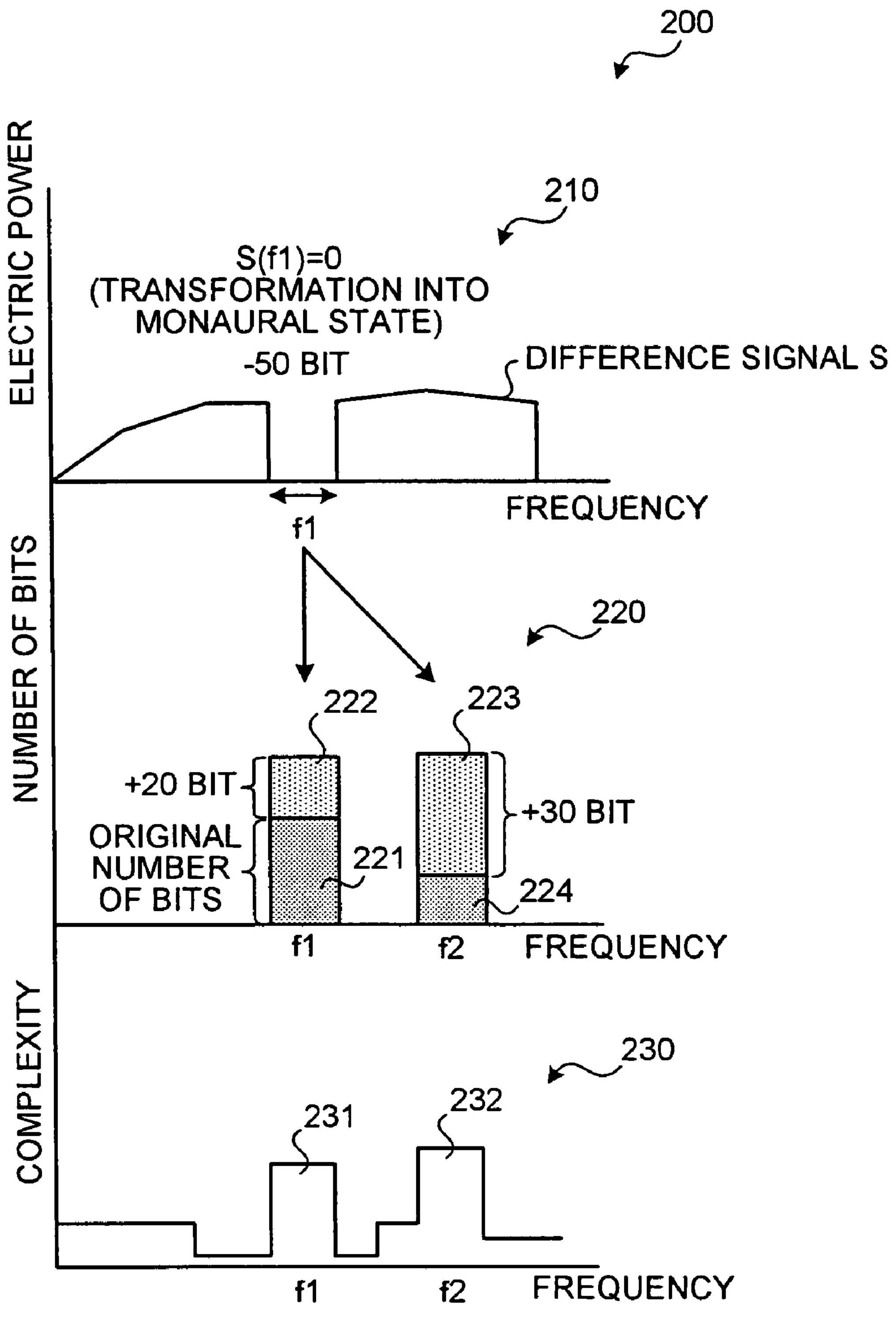
FIG. 2 is a schematic for explaining a method of allocating the number of bits corresponding to complexity of a sum signal M.

FIG. 2 is a schematic for explaining a method of allocating the number of bits corresponding to complexity of the sum signal M. In a chart 200 shown in FIG. 2, a chart 210 represents the electric power of the difference signal S, a chart 220 represents the number of bits of the sum signal M, and a chart 230 represents the complexity of the sum signal M.

The chart 210 represents the electric power for each frequency of the difference signal S with the abscissas axis representing the frequency and the ordinate axis representing the electric power. The difference signal S at the frequency f1 is transformed into a signal with the electric power of zero by the transformation into the monaural state. Due to this transformation, the number of bits of the difference signal S is decreased (−50 bits in the example of the chart 210).

The chart 220 represents the number of quantization bits for each frequency of the sum signal M with the abscissas axis representing the frequency and the ordinate axis representing the number of bits after the sum signal M is quantized. As represented in the chart 210, a number of bits (−50 bits) taken out from the difference signal S at the frequency f1 is allocated and added respectively to an original number of bits 221 of the sum signal M at the frequency f1 and an original number of bits 224 of the sum signal M at the frequency f2. In the example of the chart 220, the sum signal M at the frequency f1 is added with a number of bits 222 of +20 bits and the sum signal M at the frequency f2 is added with a number of bits 223 of +30 bits.

The chart 230 represents complexity for each frequency of the sum signal M with the abscissas axis representing the frequency and the ordinate axis representing the complexity. The addition of the number of bits to the sum signal M as shown in the chart 220 are determined corresponding to the complexity for each frequency of the sum signal M shown in the chart 230. Therefore, complexity 231 of the sum signal M at the frequency f1 and complexity 232 of the sum signal at the frequency f2 are caused to correspond to numbers of bits 222 and 223 allocated according to the chart 220.

Figure 3:
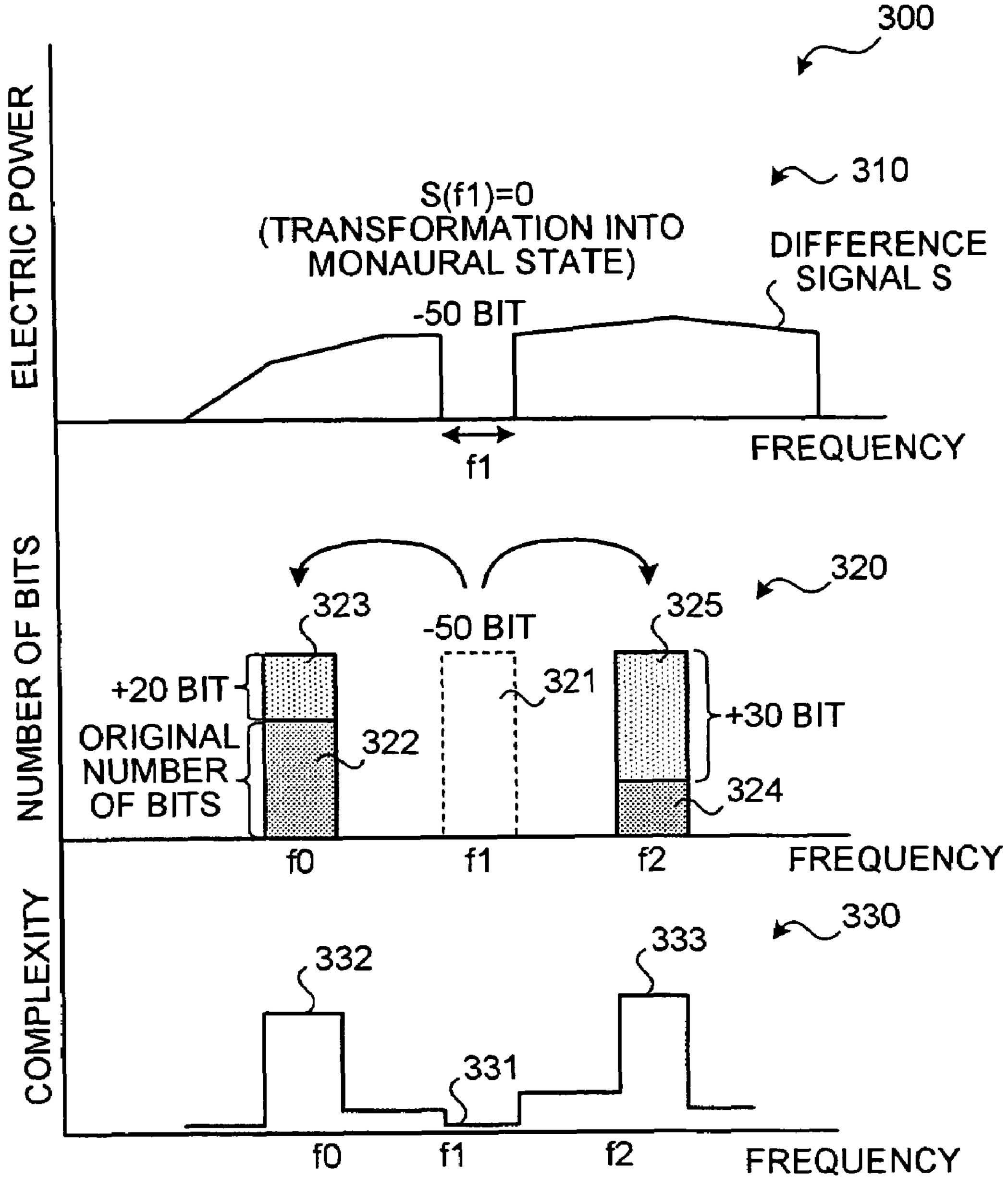
FIG. 3 is a schematic for explaining a method of allocating the number of bits corresponding to complexity of a difference signal S.

FIG. 3 is a schematic for explaining a method of allocating the number of bits corresponding to complexity of the difference signal S. In a chart 300 shown in FIG. 3, a chart 310 represents the electric power of the difference signal S, a chart 320 represents the number of bits of the difference signal S, and a chart 330 represents the complexity of the difference signal S.

The chart 310 represents the electric power for each frequency of the difference signal S with the abscissas axis representing the frequency and the ordinate axis representing the electric power. The difference signal S at the frequency f1 is transformed into a signal with the electric power of zero by the transformation into the monaural state. Due to this transformation, the number of bits of the difference signal S is decreased (−50 bits in the example of the chart 310).

The chart 320 represents the number of quantization bits for each frequency of the difference signal S with the abscissas axis representing the frequency and the ordinate axis representing the number of bits after the difference signal S is quantized. As represented in the chart 310, a number of bits (−50 bits) 321 taken out from the difference signal S at the frequency f1 is allocated and added respectively to an original number of bits 322 of the difference signal S at a frequency f0 and an original number of bits 324 of the difference signal S at the frequency f2. When bits are added to the difference signal S, as shown in the chart 310, because the difference signal S at the frequency f1 is transformed into a signal having electric power of zero, the number of bits 321 is not necessary. Therefore, corresponding to the complexity of the difference signal S, the number of bits of each of the difference signals S respectively at the frequency f0 and the frequency f2 is increased by adding the number of bits (the numbers of bits 323 and 325 in the example of FIG. 3) and the quantization error of each of those signals is reduced.

The chart 330 represents complexity for each frequency of the difference signal S with the abscissas axis representing the frequency and the ordinate axis representing the complexity. As shown in the chart 330, complexity 332 of the difference signal S at the frequency f0 and complexity 333 of the difference signal S at the frequency f2 are high and, therefore, are reflected to the allocation of the numbers of bits as shown in the chart 320. The difference signal S at the frequency f1 shows the complexity 331 even though the difference signal has the number of bits of zero. This is because the complexity indicates complexity of the difference signal S at the frequency f1 before the difference signal S has been transformed into the monaural state having the electric power of zero.

As described, the number of bits of the difference signal decreased by the transformation into the monaural state is allocated corresponding to the complexity to signals of high complexity of the sum signal M or the difference signal S. In the allocation of the numbers of bits, the total complexity including that of the sum signal M and the difference signal S is obtained and important signals are extracted. More specifically, when the complexity of the sum signal M is higher than that of the difference signal S, a more number of bits are allocated to the sum signal M. On the contrary, when the complexity of the difference signal S is higher than that of the sum signal M, a more number of bits are allocated to the difference signal S.

Figure 4:
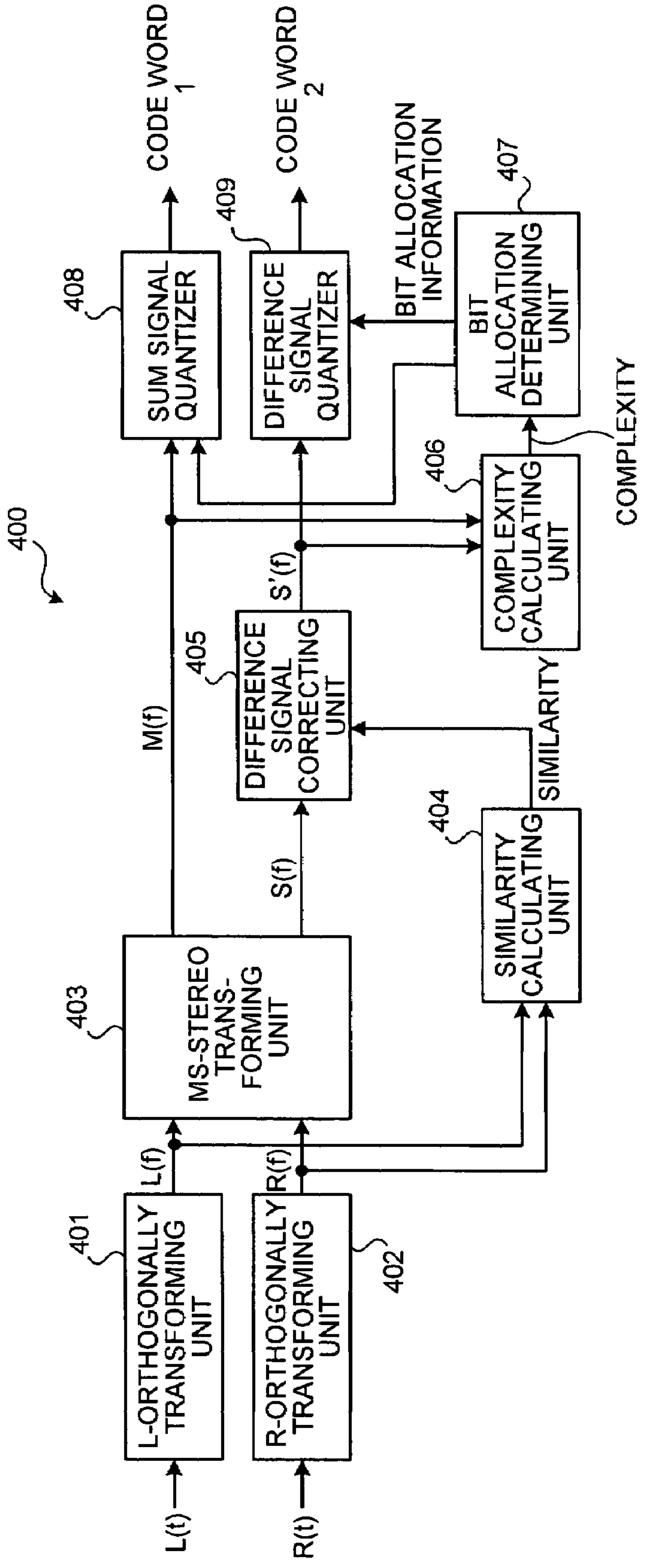
FIG. 4 is a block diagram of an encoding apparatus according to embodiments of the present invention.

FIG. 4 is a block diagram of the encoding apparatus according to embodiments of the present invention. An encoding apparatus 400 encodes based on the principle of encoding described above. The encoding apparatus 400 includes an L-orthogonally transforming unit 401, an R-orthogonally transforming unit 402, an MS-stereo transforming unit 403, a similarity calculating unit 404, a difference signal correcting unit 405, a complexity calculating unit 406, a bit allocation determining unit 407, a sum signal quantizer 408, and a difference signal quantizer 409.

The L-orthogonally transforming unit 401 orthogonally transforms an input signal in the time domain (a stereo signal L(t) on the left channel) and outputs a spectrum signal L(f). Orthogonal transformation is a process that transforms a signal from a space coordinate in the time domain t to a frequency coordinate f. Similarly, the R-orthogonally transforming unit 402 orthogonally transforms an input signal in the time domain (a stereo signal R(t) on the right channel) and outputs a spectrum signal R(f).

The MS-stereo transforming unit 403 MS-stereo-transforms the spectrum signal L(f) input from the L-orthogonally transforming unit 401 and the spectrum signal R(f) input from the R-orthogonally transforming unit 402 and outputs those signals as a sum signal M(f) and a difference signal S(f) by spectrum signals that shows values corresponding to the frequency.

The similarity calculating unit 404 obtains the similarity between the spectrum signal L(f) input from the L-orthogonally transforming unit 401 and the spectrum signal R(f) input from the R-orthogonally transforming unit 402. The similarity is a value that is numerically calculated correlation between the spectrum signal L(f) and the spectrum signal R(f). The similarity calculated by the similarity calculating unit 404 is input into the difference signal correcting unit 405.

The difference signal correcting unit 405 corrects the difference signal S(f) input from the MS-stereo transforming unit 403 based on the similarity input from the similarity calculating unit 404 and generates a corrected difference signal S'(f). The process executed by the difference signal correcting unit 405 corresponds to the transformation into the monaural state. As specific content of the process, whether the similarity of the difference signal S for each frequency is higher than a predetermined threshold is determined. A difference signal S having higher similarity than that of the threshold has the difference that becomes ≈0, and is generated as the corrected difference signal S'(f)=0 by the transformation into the monaural state. A difference signal having lower similarity than that of the threshold is generated as it is as the corrected difference signal S'(f)≈S(f) because the difference is large.

The complexity calculating unit 406 obtains the similarity PE_m_ave of the sum signal M(f) using the sum signal M(f) input from the MS-stereo transforming unit 403, obtains the similarity PE_s_ave of the corrected difference signal S'(f) using the corrected difference signal S'(f) input from the difference signal correcting unit 405, obtains the ratio of the obtained similarity PE, and outputs this ratio to the bit allocation determining unit 407.

The bit allocation determining unit 407 determines the proportion of the distribution of the numbers of bits, corresponding to the value of the ratio of the similarity PE input from the similarity calculating unit 406, and outputs bit allocation information respectively to the sum signal quantizer 408 and the difference signal quantizer 409. The allocation is executed based on the comparison between the ratio of the similarity PE and the threshold.

The sum signal quantizer 408 quantizes the sum signal M(f) input from the MS-stereo transforming unit 403 based on the bit allocation information input from the bit allocation determining unit 407. The sum signal M(f) after quantization is output as a code word 1. Similarly, the difference signal quantizer 409 quantizes the corrected difference signal S'(f) input from the difference signal correcting unit 405 based on the bit allocation information input from the bit allocation determining unit 407. The corrected difference signal S'(f) after quantization is output as a code word 2.

The encoding apparatus 400 encodes a stereo signal using the basic configuration described above.

In a first embodiment, in a complexity calculating unit 510 (see FIG. 5A) that corresponds to the complexity calculating unit 406, perceptual entropy (PE value) of the sum signal M and the corrected difference signal S' is respectively obtained and the ratio of the PE values is output as the complexity. In the bit allocation determining unit 407, the proportion of distribution of the number of bits is determined corresponding to the corresponding relation between the complexity and the corrected difference signal S' in a predetermined manner.

Figure 5A:
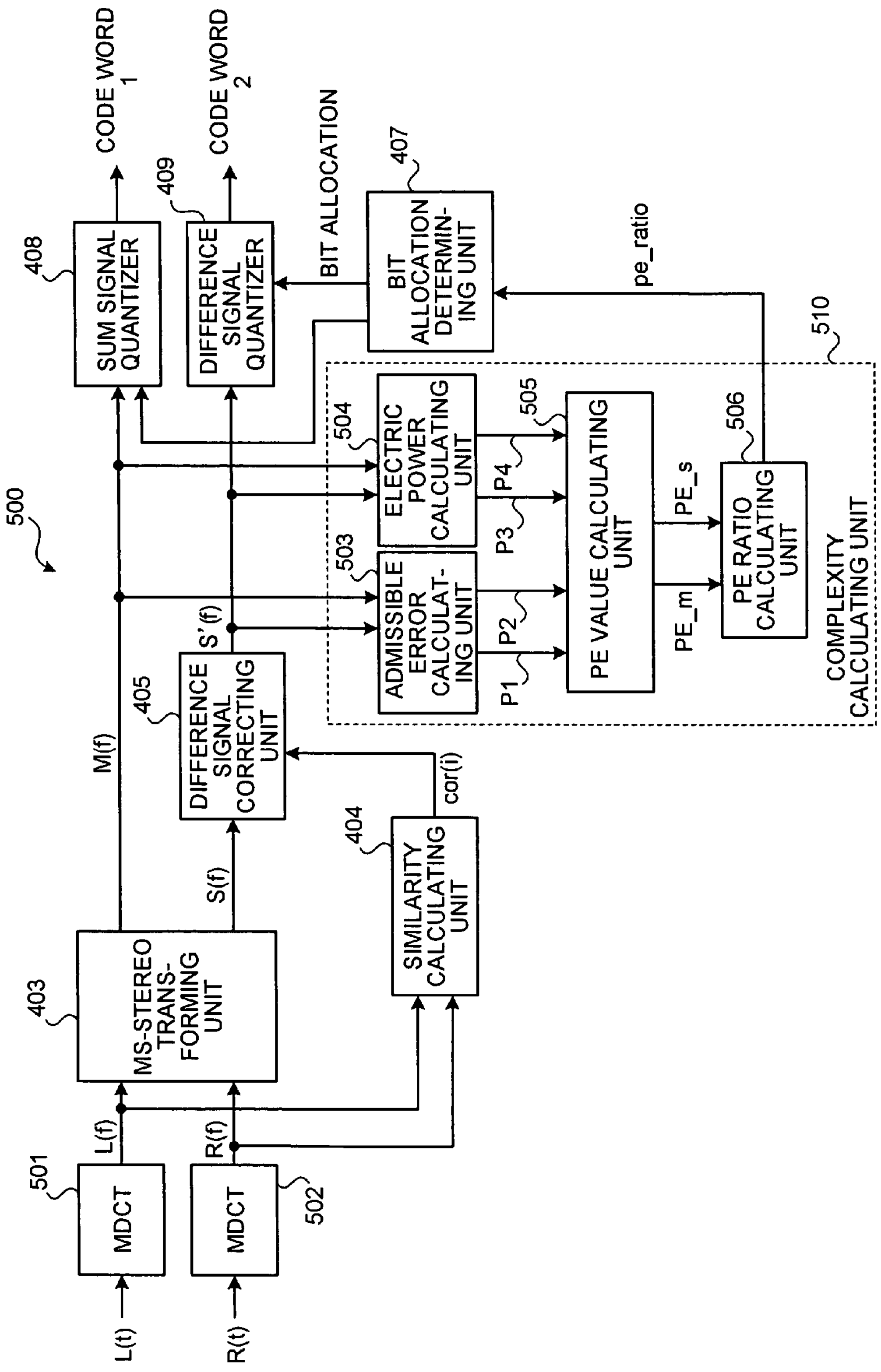
FIG. 5A is a block diagram of an encoding apparatus according to a first embodiment of the present invention.

FIG. 5A is a block diagram of an encoding apparatus according to the first embodiment. An encoding apparatus 500 shown in FIG. 5A represents a specific embodiment of the basic configuration shown in FIG. 4.

Figure 5B:
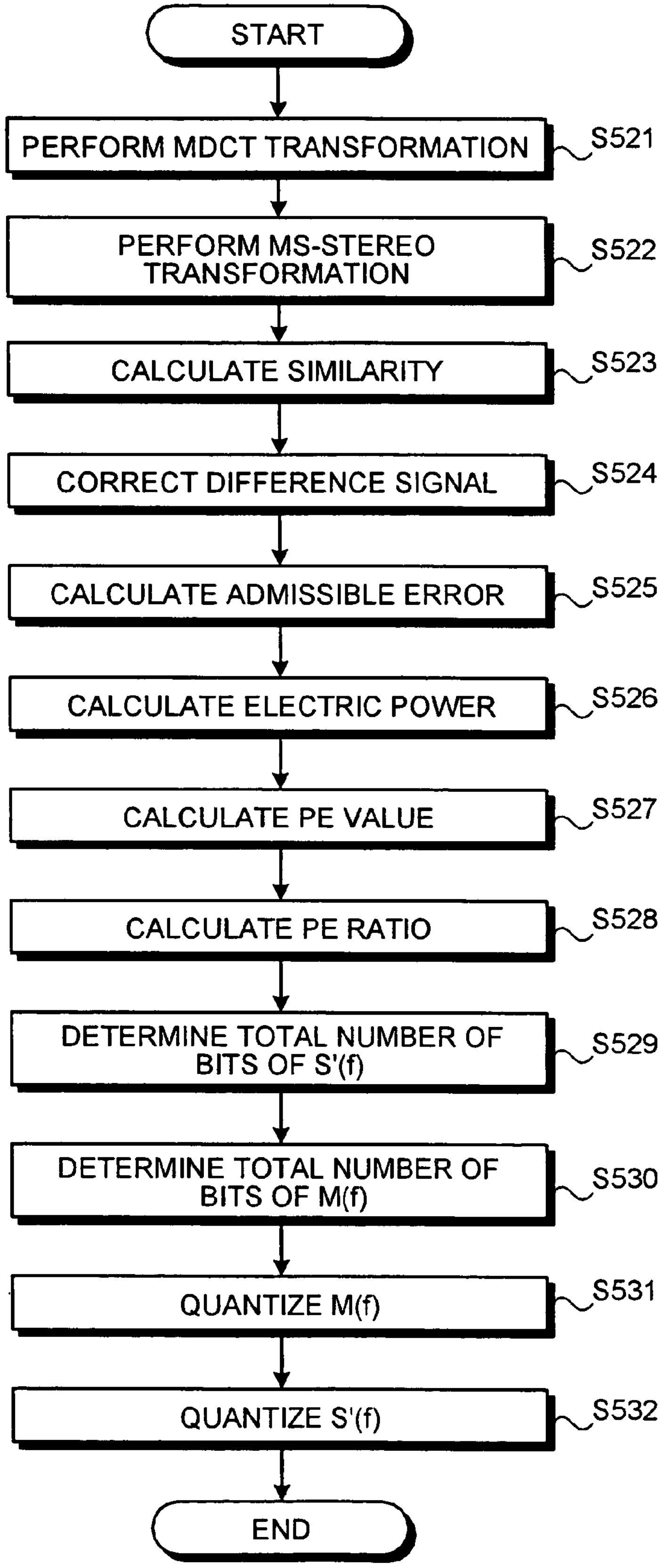
FIG. 5B is a flowchart of an encoding process by the encoding apparatus according to the first embodiment.

FIG. 5B is a flowchart of an encoding process of the encoding apparatus of the first embodiment. In the flowchart of FIG. 5B, modified discrete cosine transform (MDCT) is executed to left and right stereo signals L(t) and R(t) in an MDCT 501 and an MDCT 502 (step S521). In the first embodiment to a third embodiment, MDCT is used to realize the process of the L-orthogonally transforming unit 401 and the R-orthogonally transforming unit 402. Because block distortion is generated at block interfaces when components are extracted in the ordinary DCT process, the MDCT is a transforming process that removes block distortion by overlapping 50% of the block section length onto the adjacent blocks respectively.

Left and right spectrum signals L(f) and R(f) are MS-stereo transformed by the MS-stereo transforming unit 403 (step S522). The similarity between the spectrum signal L(f) and the spectrum signal R(f) is calculated by the similarity calculating unit 404 (step S523). The similarity calculation in the similarity calculating unit 404 will be described specifically. The similarity employs the correlation between the spectrum signal L(f) and the spectrum signal R(f).

Figure 6:
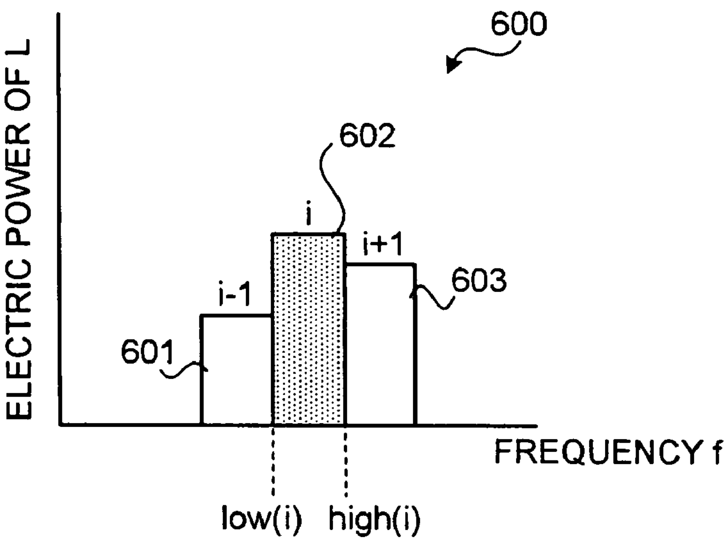
FIG. 6 is a chart for illustrating the relation between the upper limit and the lower limit of a band of a signal.

FIG. 6 is a chart for illustrating the relation between the upper limit and the lower limit of a band of a signal. A chart 600 has the abscissas axis representing the frequency f and the ordinate axis representing the electric power of the stereo signal L. Because each signal is constituted of plural frequency bands (for example, bands i−1, i, i+1 denoted by frequency bands 601 to 603), correlation cor(i) is obtained using an Equation 1 below for each frequency band. Therefore, the correlation cor(i) is input from the similarity calculating unit 404 into the difference signal correcting unit 405.

$$cor(i) = \frac{\sum_{j=low(i)}^{high(i)} L(j)\cdot R(j)}{\sum_{j=low(i)}^{high(i)} L(j)^2} \tag{1}$$

The difference signal S(f) input from the MS-stereo transforming unit 403 is corrected by the difference signal correcting unit 405 based on the correlation cor(i) (step S524). The difference signal correcting unit 405 compares the correlation cor(i) with the threshold for each band of the difference signal S(f). More specifically, when the correlation cor(i) is equal or above the threshold, the corrected difference signal S'(f)=0 for all frequencies f contained in the band i (see FIG. 6). When the correlation cor(i) is equal lower than the threshold, the corrected difference signal S'(f)=S(f) for all frequencies f contained in the band i (see FIG. 6).

The complexity calculating unit 510 is constituted of an admissible error calculating unit 503, an electric power calculating unit 504, a PE value calculating unit 505, and a PE ratio calculating unit 506. The complexity calculating unit 510 first calculates an admissible error by the admissible error calculating unit 503 (step S525).

The admissible error calculating unit 503 is input with the sum signal M(f) from the MS-stereo transforming unit 403, input with the corrected difference signal S'(f) from the difference signal correcting unit 405, and obtains admissible error electric power n_m(i) of the sum signal M(f) and admissible error electric power n_s(i) of the corrected difference signal S'(f). As the calculation of the admissible error electric power in this step, for example, calculation of admissible error electric power in the psychoacoustic model that is a known technique (ISO/IEC 13818-7:2003, Advanced Audio Coding) can be used.

Electric power is calculated by the electric power calculating unit 504 (step S526). The electric power calculating unit 504 obtains electric power e_m(i) in the band i of the sum signal M(f) input from the MS-stereo transforming unit 403 and electric power e_s(i) in the band i of the corrected difference signal S'(f) input from the difference signal correcting unit 405, from Equations 2 and 3 below.

$$e\_m(i) = \sum_{j=low(i)}^{high(i)} M(j)^2 \tag{2}$$

$$e\_s(i) = \sum_{j=low(i)}^{high(i)} s'(j)^2 \tag{3}$$

Complexity PE value calculation is executed by the PE value calculating unit 505 (step S527). The PE value calculating unit 505 is input with admissible error electric power n_m (P1) of the sum signal M and admissible error electric power n_s (P2) of the corrected difference signal S' from the admissible error calculating unit 503, and is input with electric power e_m (P3) of the sum signal M and electric power e_s (P4) of the corrected difference signal S' from the electric power calculating unit 504. The PE value calculating unit 505 obtains complexity PE_m of the sum signal M from the admissible error electric power n_m of the sum signal M and the electric power e_m of the sum signal M, using Equation 4 below. Similarly, using Equation 5, complexity PE_s of the corrected difference signal S' is obtained from the admissible error electric power n_s of the corrected difference signal S' and the electric power e_s of the corrected difference signal S'. "n" used for sigma in Equations 4 and 5 represents the number of bands.

$$PE\_m = -\sum_{i=0}^{n-1} (\mathrm{high}(i) - \mathrm{low}(i))\cdot \log_{10}\left(\frac{n\_m(i)}{e\_m(i)+1}\right) \tag{4}$$

$$PE\_s = -\sum_{i=0}^{n-1} (\mathrm{high}(i) - \mathrm{low}(i))\cdot \log_{10}\left(\frac{n\_s(i)}{e\_s(i)+1}\right) \tag{5}$$

PE ratio calculation is executed by the PE ratio calculating unit 506 (step S528). The PE ratio calculating unit 506 is input with the complexity PE_m of the sum signal M and the complexity PE_s of the corrected difference signal S' from the PE value calculating unit 505, obtains the proportion of the complexity PE_s of the corrected difference signal S' to the complexity PE_m of the sum signal M using Equation 6 below, and the ratio (PE ratio) of the complexity is output to the bit allocation determining unit 407 as pe_ratio. The process of the complexity calculating unit 510 is ended with the steps up to this step. The complexity calculating unit 510 may calculate a difference (PE difference) between PE values, instead of the PE ratio, to output to the bit allocation determining unit 407. Moreover, when calculating the PE ratio or the PE difference, a sum or an average of PE values obtained at all frequency bands of each of the sum signal and the difference signal may be used.

$$pe\_ratio=PE\_s/PE\_m \quad (6)$$

The process in the bit allocation determining unit 407 will be described. The total number of bits of the corrected difference signal S'(f) is determined (step S529), and the total number of bits of the sum signal M(f) is determined (step S530). As the specific procedure for determining the total number of bits of the corrected difference signal S'(f), the relation of distributed numbers of bits between the complexity ratio pe_ratio and the corrected difference signal S'(f) is determined in advance.

Figure 7:
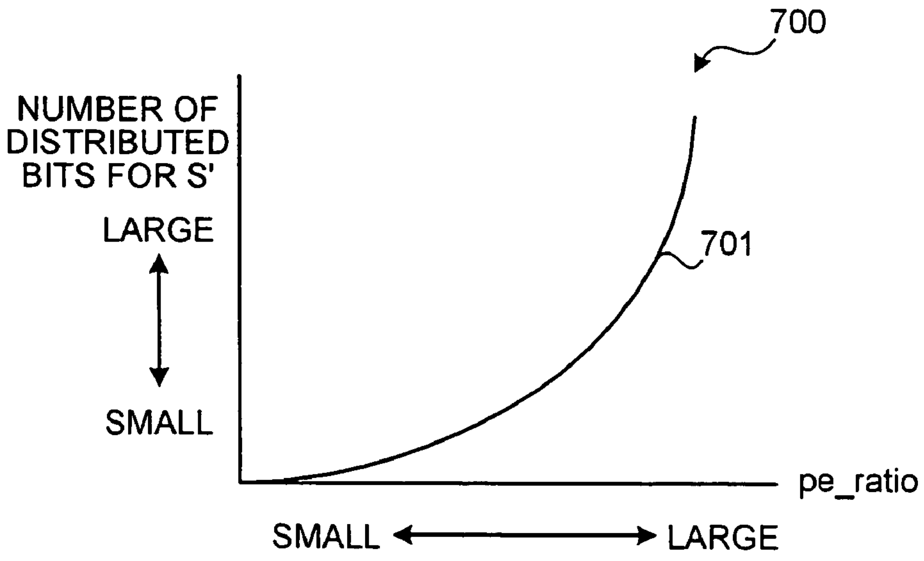
FIG. 7 is a chart for illustrating the relation of the PE ratio and the bit distribution.

FIG. 7 is a chart representing the relation of the PE ratio and the bit distribution. A chart 700 has the abscissas axis representing the complexity ratio pe_ratio and the ordinate axis representing the number of distributed bits of the corrected difference signal S'. A curve 701 represents the relation between the complexity ratio pe_ratio and the bit distribution. The bit allocation determining unit 407 determines in advance the relation between the complexity ratio pe_ratio and the bit distribution as in the chart 700. More specifically, when the value of the complexity pe_ratio is large, the number of the distributed bits for the corrected difference signal S' is made large and, when the value of the complexity pe_ratio is small, the number of the distributed bits for the corrected difference signal S' is made small. That is, the curve 701 that represents distributing a large number of bits to a band with large complexity of the corrected difference signal S', has been set.

The number of bits of the sum signal M is determined based on the distribution of the number of bits to the corrected difference signal S'(f) determined at step S529. More specifically, expressing the number of quantization bits for one frame as bit_total, the number of bits bit_s of the corrected difference signal S' is obtained using the curve 701 of FIG. 7, the number of bits bit_s of the corrected difference signal S' is subtracted from bit_total, and the number of bits bit_m of the sum signal M is obtained (bit_m=bit_total−bit_s).

In response to the number of bits obtained as above, the sum signal quantizer 408 quantizes the sum signal M(f) with the number of bits bit_m (step S531). The difference signal quantizer 409 quantizes the corrected difference signal S'(f) with the number of bits bit_s (step S532) and the series of processes end.

A second embodiment uses a method different from that of the first embodiment in calculating the complexity in a complexity calculating unit 810. In bit allocation in the bit allocation determining unit 407, Second embodiment also distributes the number of bits corresponding to weighting factors of the PE values.

Figure 8A:
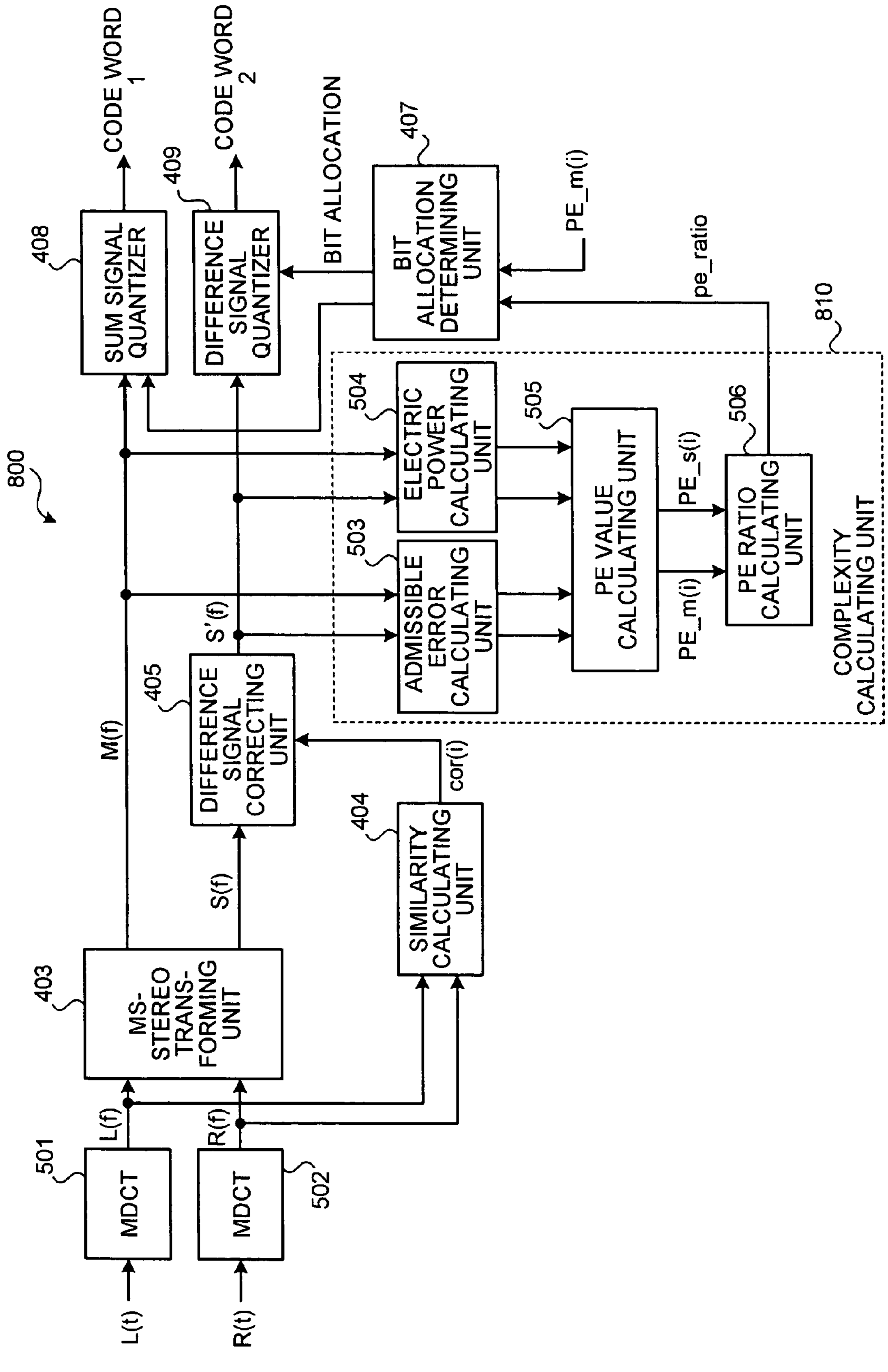
FIG. 8A is a block diagram of an encoding apparatus according to a second embodiment of the present invention.

FIG. 8A is a block diagram of an encoding apparatus of Second embodiment. An encoding apparatus 800 according to the second embodiment encodes using the same configuration as that of the encoding apparatus 500 according to the first embodiment. However, the content of the process of the complexity calculating unit 810 is different and the bit allocation method in the bit allocation determining unit 407 is varied accordingly. Therefore, the PE value calculating unit 505, the PE ratio calculating unit 506, and the bit allocation determining unit 407 that characterize the encoding apparatus 800 will be described in detail. Since the remaining portion of the configuration is same as that of the encoding apparatus 500, the components in the portion will be given the same reference numerals and description for the portion will be omitted.

Figure 8B:
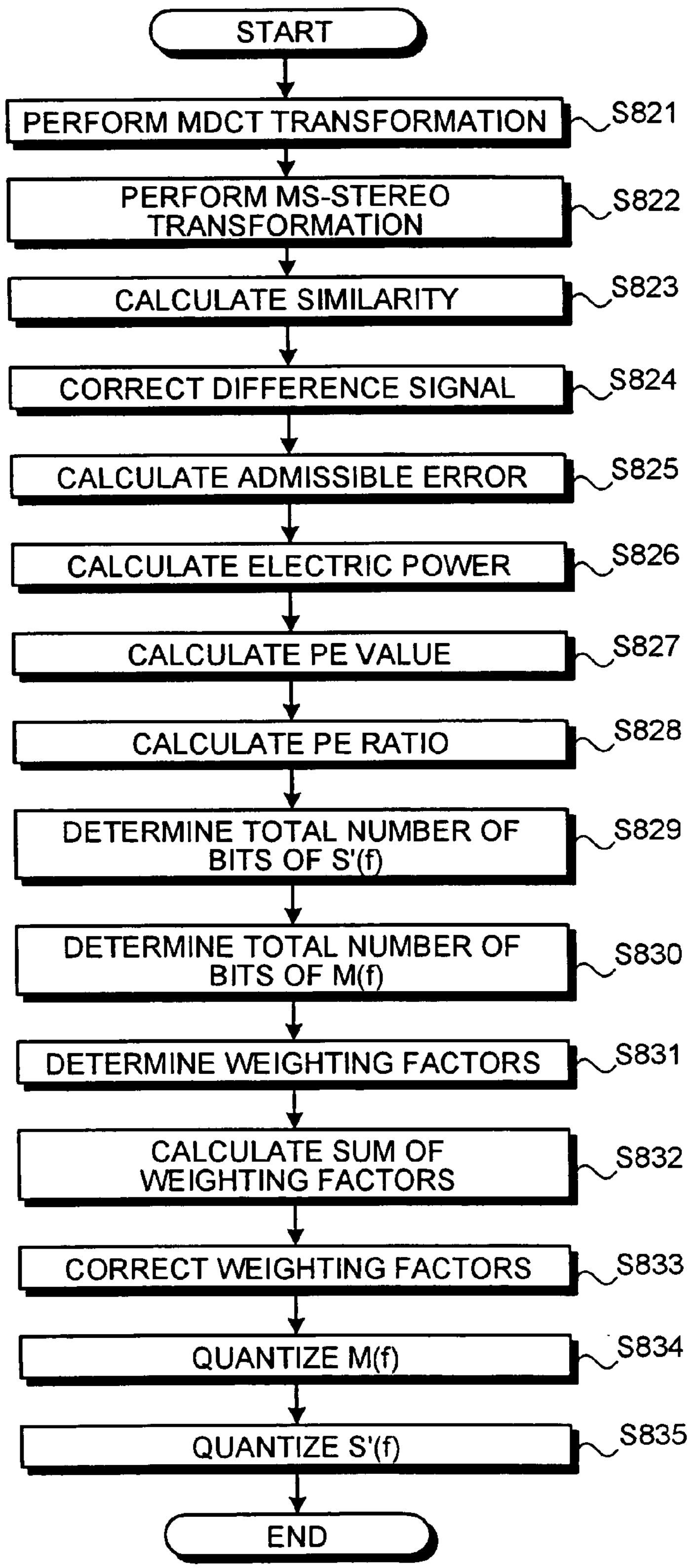
FIG. 8B is a flowchart of an encoding process by the encoding apparatus according to the second embodiment.

FIG. 8B is a flowchart of an encoding process of the encoding apparatus according to the second embodiment. In the flowchart of FIG. 8B, at step S821 to step S824, the same processes as that of step S521 to step S524 in the flowchart shown in FIG. 5B are executed.

Similarly, in the process, admissible amount error calculation (step S825) in the admissible error calculating unit 503 and electric power calculation (step S826) in the electric power calculating unit 504 respectively execute the same processes as step S525 and step S526 in the flowchart shown in FIG. 5B. The PE value calculation is executed by the PE value calculating unit 505 (step S827). Similarly, in this process, the PE value calculating unit 505 is input with the admissible error electric power n_m of the sum signal M and the admissible error electric power n_s of the corrected difference signal S' from the admissible error calculating unit 503, and is input with the electric power e_m of the sum signal M and the electric power e_s of the corrected difference signal S' from the electric power calculating unit 504.

However, the PE value calculating unit 505 obtains complexity PE_m(i) of the sum signal M from the admissible error electric power n_m of the sum signal M and electric power e_m of the sum signal M using Equation 7 below. Similarly, the PE value calculating unit 505 obtains complexity PE_s(i) of the corrected difference signal S' from the admissible error electric power n_s of the corrected difference signal S' and electric power e_s of the corrected difference signal S' using Equation 8 below.

$$PE\_m(i) = -(\mathrm{high}(i) - \mathrm{low}(i)) \cdot \log_{10}\left(\frac{n\_m(i)}{e\_m(i)+1}\right), \quad (i = 0, \ldots , n-1) \quad (7)$$

$$PE\_s(i) = -(\mathrm{high}(i) - \mathrm{low}(i)) \cdot \log_{10}\left(\frac{n\_s(i)}{e\_s(i)+1}\right), \quad (i = 0, \ldots , n-1) \quad (8)$$

PE ratio calculation is executed by the PE ratio calculating unit 506 (step S828). The PE ratio calculating unit 506 is input with complexity PE_m(i) of the sum signal M and complexity PE_s(i) of the corrected difference signal S' from the PE value calculating unit, obtains the proportion of the complexity PE_s of the corrected difference signal S' to the complexity PE_m of the sum signal M using Equation 9 below, and outputs the ratio (PE ratio) of the complexity to the bit allocation determining unit 407 as pe_ratio. The process of the complexity calculating unit 810 ends with these steps.

$$pe\_ratio = \sum_{i=0}^{n-1} PE\_s(i) \Big/ \sum_{i=0}^{n-1} PE\_m(i) \quad (9)$$

A process in the bit allocation determining unit 407 will be described. The total number of bits of the corrected difference signal S'(f) is first determined (step S829) and the total number of bits of the sum signal M(f) is determined (step S830). As the specific procedure of determining the total number of bits of the corrected difference signal S'(f), similarly to that of First embodiment, the number of quantization bits bit_s of the corrected difference signal S'(f) is determined in advance corresponding to pe_ratio. The reminder obtained by subtracting bit_s from the number of quantization bits bit_total that can be used in one frame is the number of quantization bits bit_m of the sum signal M. At this point, the upper limit of the number of bits to be distributed respectively to frequency bands of the sum signal M is determined.

Figure 9:
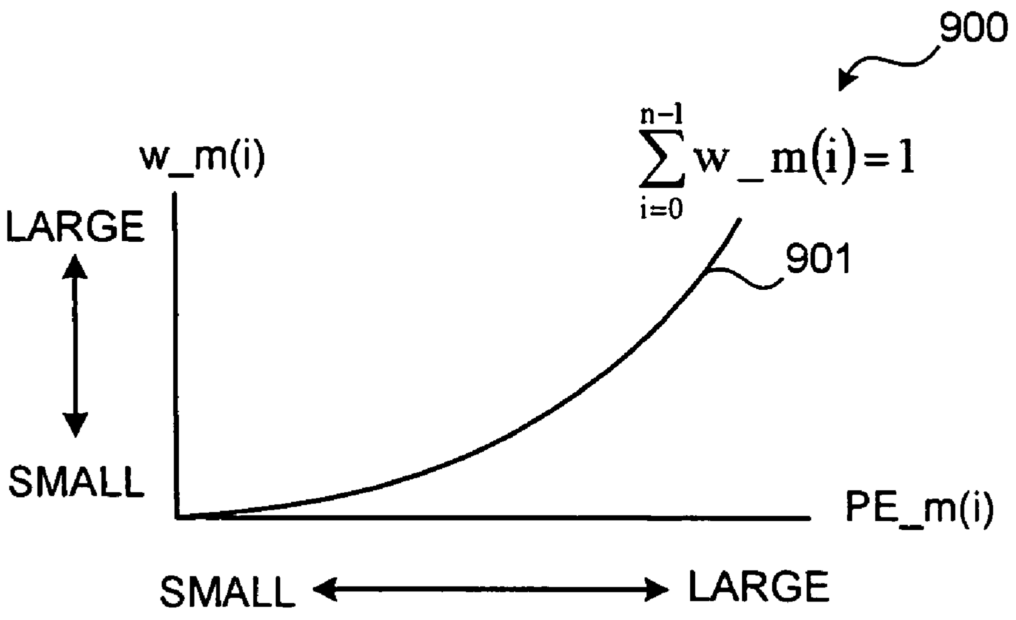
FIG. 9 is a chart for illustrating relation between complexity PE_m and a weighting factor w_m.

A weighting factor w_m(i) is determined (step S831). FIG. 9 is a chart for illustrating the relation between the complexity PE_m and the weighting factor w_m. A chart 900 has the abscissas axis representing the complexity PE_m(i) and the ordinate axis representing the weighting factor w_m(i). A curve 901 represents the relation between the complexity PE_m and the weighting factor w_m. The relation such as that represented by the curve 901 is determined in advance to determine the upper limit of the number of bits to be distributed respectively to the frequency bands of the sum signal M. The weighting factor w_m(i) is determined from the value of the complexity PE_m(i) and the relation of the chart 900 for each frequency band i.

The sum of the weighting factors sum_w is calculated (step S832). The sum sum_w of the weighting factors w_m(i) is obtained using Equation 10 below. To execute correction of the weighting factors (step S833), the weighting factors w_m (i) is normalized (w_m2(i)) using Equation 11 below. Because the factors are normalized as a sum, the sum of w_m2 becomes one.

$$\text{sum\_w} = \sum_{i=0}^{n-1} \text{w\_m}(i) \tag{10}$$

$$\text{w\_m2}(i) = \text{w\_m}(i)/\text{sum\_w} \tag{11}$$

The upper limit bit_m(i) of the number of bits to be distributed respectively to the frequency bands of the sum signal M is determined using Equation 12 below and the process of the bit allocation determining unit 407 ends.

$$\text{bit\_}m(i)=\text{bit\_}m\cdot w\_m2(i),\ (i=0, \ldots, n-1) \tag{12}$$

Corresponding to the number of bits obtained as above, the sum signal quantizer 408 quantizes the sum signal M(f) with the number of bits bit_m (step S834). The difference signal quantizer 409 quantizes the corrected difference signal S'(f) with the number of bits bit_s (step S835) and the series of processes ends with this step.

A third embodiment according to the present invention determines the proportion of the distribution of the number of bits of the sum signal M(f) and the corrected difference signal S'(f) based on the ratio of electric power of the sum signal M(f) and the corrected difference signal S'(f). Therefore, an encoding apparatus 1000 according to the third embodiment has a configuration including a complexity calculating unit 1010 that is a simplified version of the complexity calculating unit 510 of the encoding apparatus 500 described in the first embodiment.

Figure 10A:
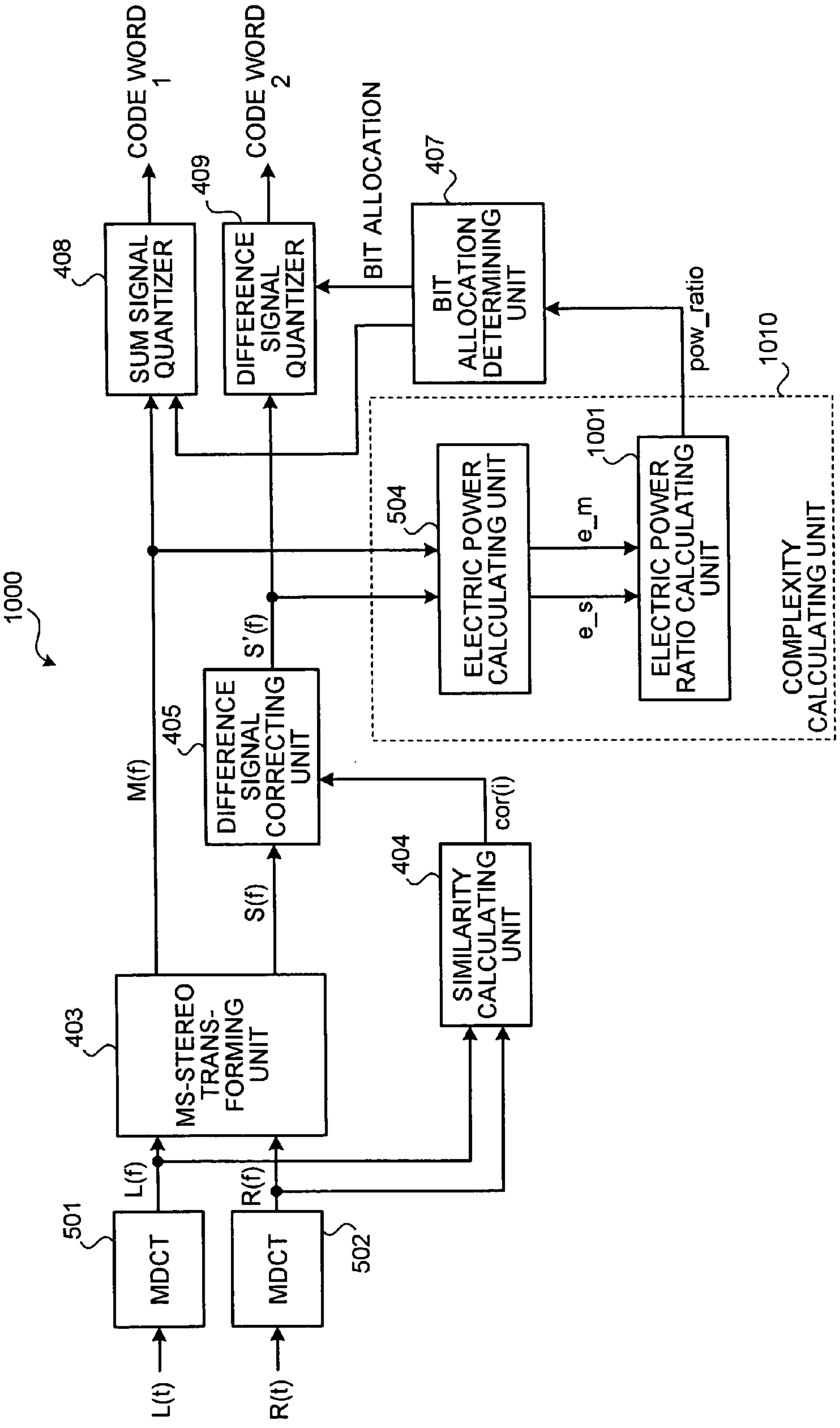
FIG. 10A is a block diagram showing the configuration of an encoding apparatus according to a third embodiment of the present invention.

FIG. 10A is a block diagram of an encoding apparatus according to the third embodiment. The encoding apparatus 1000 shown in FIG. 10A has the complexity calculating unit 1010 instead of the complexity calculating unit 510 of the encoding apparatus shown in FIG. 5A. The complexity calculating unit 1010 is constituted of the electric power calculating unit 504 and an electric power ratio calculating unit 1001. Since the remaining portion of the configuration of the encoding apparatus 1000 is same as that of the encoding apparatus 500, the components in the portion will be given the same reference numerals and description for the portion will be omitted. The bit allocation determining unit 407 determines the bit allocation corresponding to the complexity calculated by the complexity calculating unit 1010.

Figure 10B:
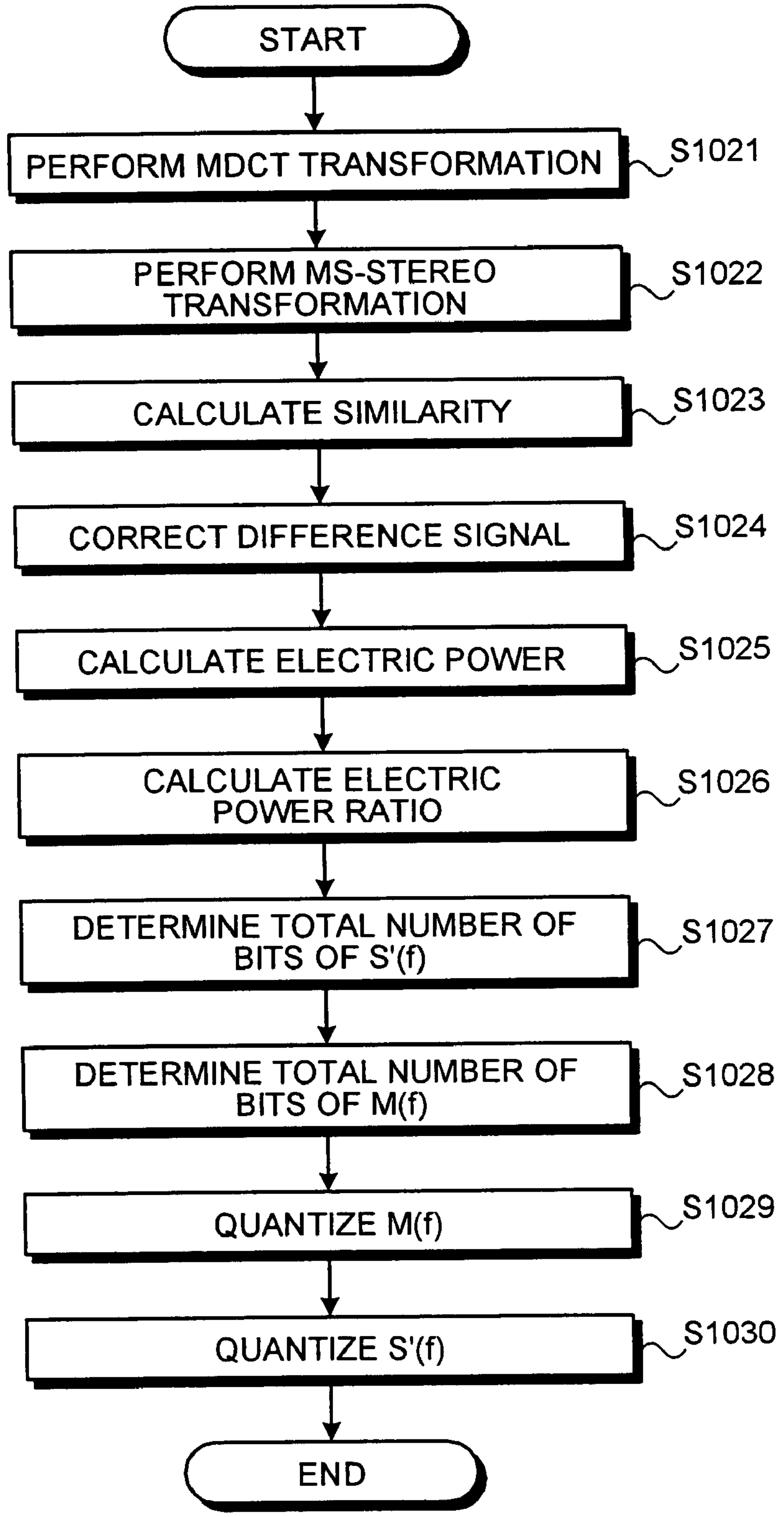
FIG. 10B is a flowchart of an encoding process by the encoding apparatus according to the third embodiment.

FIG. 10B is a flowchart of the encoding process by the encoding apparatus according to the third embodiment. As shown in FIG. 10B, MDCT transformation of the left and right stereo signals L(t) and R(t) is executed in the MDCT 501 and the MDCT 502 (step S1021).

MS-stereo transformation is executed to the left and right spectrum signals L(f) and R(f) by the MS-stereo transforming unit 403 (step S1022). The similarity (the correlation cor(i)) between the spectrum signal L(f) and the spectrum signal R(f) is calculated by the similarity calculating unit 404 (step S1023) and the difference signal S(f) is corrected by the difference signal correcting unit 405 based on the calculated similarity (the correlation cor(i)) (step S1024).

Calculation of electric power of the sum signal M(f) and the corrected difference signal S'(f) is executed by the electric power calculating unit 504 (step S1025). The electric power e_m of the sum signal M and the electric power e_s of the corrected difference signal S' calculated by the electric power calculating unit 504 is output to the electric power ratio calculating unit 1001.

The electric power ratio of the electric power e_m of the sum signal M and the electric power e_s of the corrected difference signal S' is calculated by the electric power ratio calculating unit 1001 (step S1026). The electric power ratio pow_ratio of the sum signal M and the corrected difference signal S' is obtained by e_s/e_m. The calculated electric power ratio pow_ratio of the sum signal M and the corrected difference signal S' is output to the bit allocation determining unit 407. The complexity calculating unit 510 may calculate a difference (power difference) between electric powers, instead of the power ratio, to output to the bit allocation determining unit 407. Moreover, when calculating the power ratio or the power difference, a sum or an average of electric powers obtained at all frequency bands of each of the sum signal and the difference signal may be used.

A process in the bit allocation determining unit 407 will be described. The total number of bits of the corrected difference signal S'(f) is determined (step S1027), and the total number of bits of the sum signal M(f) is determined (step S1028). As the specific procedure for determining the total number of bits of the corrected difference signal S'(f), the relation of numbers of distributed bits between the number of bits for the electric power ratio pow_ratio and the corrected difference signal S'(f) is determined in advance.

Figure 11:
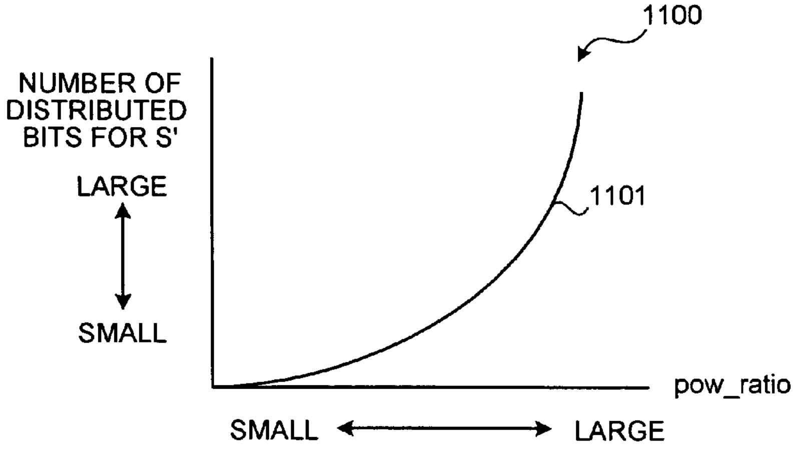
FIG. 11 is a chart for illustrating a relation between an electric power ratio pow_ratio and a bit distribution.
Figure 12:
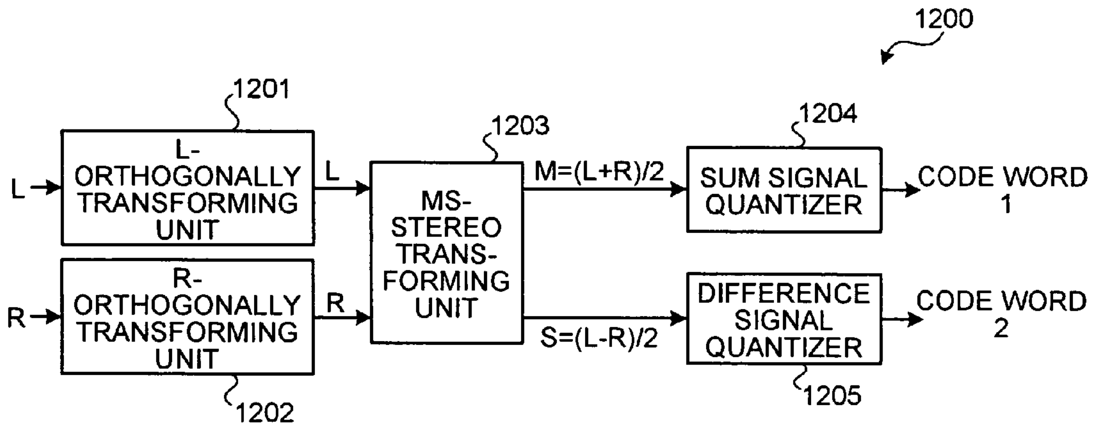
FIG. 12 is a schematic for illustrating an encoding procedure in the MS stereo encoding.
Figure 13:
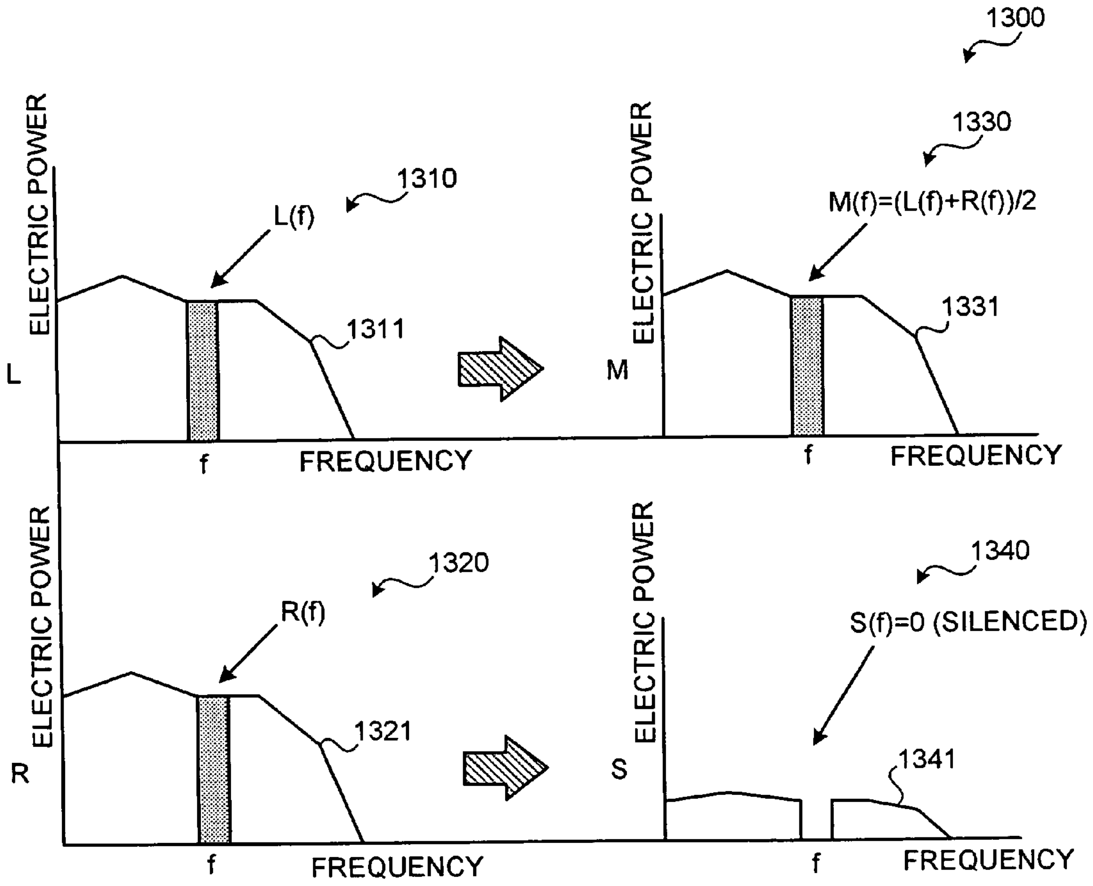
FIG. 13 is a schematic for illustrating adaptive transformation into a monaural state.

FIG. 11 is a chart for illustrating the relation between the electric power ratio pow_ratio and the bit distribution. A chart 1100 has the abscissas axis representing the electric power ratio pow_ratio and the ordinate axis representing the bit distribution. The bit allocation determining unit 407 determines in advance the relation between the electric power ratio pow_ratio and the bit distribution as in the chart 1100. More specifically, when the value of the electric power ratio pow_ratio is large, the number of the distributed bits for the corrected difference signal S' is made large, and when the value of the electric power ratio pow_ratio is small, the number of the distributed bits for the corrected difference signal S' is made small. That is, a curve 1101 that represents distributing a large number of bits to a band with large electric power of the corrected difference signal S', has been set.

The number of bits of the sum signal M is determined based on the distribution of the number of bits of the corrected difference signal S'(f) determined at step S1027. More specifically, expressing the number of quantization bits for one frame as bit_total, the number of bits bit_s of the corrected difference signal S' is obtained using the curve 1101 of FIG. 11, the number of bits bit_s of the corrected difference signal S' is subtracted from bit_total, and the number of bits bit_m of the sum signal M is obtained (bit_m=bit_total−bit_s).

In response to the number of bits obtained as above, the sum signal quantizer 408 quantizes the sum signal M(f) with the number of bits bit_m (step S1029). The difference signal quantizer 409 quantizes the corrected difference signal S'(f) with the number of bits bit_s (step S1030) and the series of processes end.

As described above, according to the embodiments of the present invention, sound (music) can be reproduced as high-sound-quality sound (music) with little sound quality degradation even under the condition of a low bit rate.

The encoding methods described in the first to the third embodiments can be realized by executing a previously prepared program by a computer such as a personal computer and a work station. This program is recorded on a computer-readable recording medium such as a hard disk, a flexible disk, a compact-disc read-only (CD-ROM), a magneto optical (MO) disk, and a digital versatile disk (DVD), and is executed by being read from the recording medium by a computer. This program may be a transmission medium that can be distributed through a network such as the Internet.

According to the embodiments describe above, it is possible to reproduce sound with little degradation of a sound quality even under a condition of a low bit rate.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An encoding apparatus that compresses a stereo signal using a sum signal and a difference signal of a left component signal and a right component signal of the stereo signal, comprising:

a transforming unit configured to transform a left spectrum signal and a right spectrum signal to produce a sum signal and a difference signal;

a comparing unit configured to compare a value indicative of an output of the difference signal with a threshold for each frequency band;

a correcting unit configured to correct the value to zero when the value is lower than the threshold;

a calculating unit configured to calculate complexity of the sum signal and complexity of the difference signal;

a setting unit configured to set, based on the complexity, an allocation rate of bits to be allocated in quantizing the sum signal and the difference signal; and a quantizing unit configured to quantize the sum signal and the difference signal based on the allocation rate, wherein the calculating unit includes:

an error and power calculating unit responsive to the transforming unit and the correcting unit for producing admissible error signals and electric power signals, a perceptual entropy value calculating unit responsive to the error and power calculating unit for calculating first and second values indicative of perceptual entropy of the sum signal and the difference signal, and the complexity is calculated based on the first and second calculated values.

2. The encoding apparatus according to claim 1, wherein the setting unit is configured to set the allocation rate so as to allocate a predetermined number of bits to each frame of the sum signal and the difference signal, the frame time-divided at a predetermined interval.

3. The encoding apparatus according to claim 1, wherein the setting unit is configured to set the allocation rate low for a signal having low complexity, and to set the allocation rate high for a signal having high complexity at a time of quantization by the quantizing unit.

4. The encoding apparatus according to claim 1, wherein, the complexity is calculated based on a ratio between the first and second calculated values.

5. The encoding apparatus according to claim 1, wherein the complexity is calculated based on a difference between the first and second calculated values.

6. The encoding apparatus according to claim 1, wherein the calculating unit is configured to calculate the first and second calculated values at all frequency bands of the sum signal and the difference signal, and the complexity is calculated based on an average of the first and second calculated values calculated at all frequency bands.

7. The encoding apparatus according to claim 1, wherein the calculating unit is configured to calculate the first and second calculated values at all frequency bands of the sum signal and the difference signal, and the complexity is calculated based on a sum of the first and second calculated values calculated at all frequency bands.

8. An encoding method in which a stereo signal is compressed using a sum signal and a difference signal of a left component signal and a right component signal of the stereo signal, comprising:

transforming a left spectrum signal and a right spectrum signal to produce a sum signal and a difference signal;

comparing a value indicative of an output of the difference signal with a threshold for each frequency band;

correcting the value to zero when the value is lower than the threshold;

calculating complexity of the sum signal and complexity of the difference signal;

setting, based on the complexity, an allocation rate of bits to be allocated in quantizing the sum signal and the difference signal; and quantizing the sum signal and the difference signal based on the allocation rate, wherein the step of calculating the complexity includes:

producing admissible error signals and electric power signals in response to the step of transforming and the step of correcting, and calculating first and second values indicative of perceptual entropy of the sum signal and the difference signal in response to the admissible error signals and the electric power signals, and the complexity is calculated based on the first and second calculated values.

9. A computer-readable recording medium that stores therein a computer program for realizing an encoding method in which a stereo signal is compressed using a sum signal and a difference signal of a left component signal and a right component signal of the stereo signal, the computer program making a computer execute:

transforming a left spectrum signal and a right spectrum signal to produce a sum signal and a difference signal;

comparing a value indicative of an output of the difference signal with a threshold for each frequency band;

correcting the value to zero when the value is lower than the threshold;

calculating complexity of the sum signal and complexity of the difference signal;

setting, based on the complexity, an allocation rate of bits to be allocated in quantizing the sum signal and the difference signal; and quantizing the sum signal and the difference signal based on the allocation rate, wherein the step of calculating the complexity includes:

producing admissible error signals and electric power signals in response to the step of transforming and the step of correcting, and calculating first and second values indicative of perceptual entropy of the sum signal and the difference signal in response to the admissible error signals and the electric power signals, and the complexity is calculated based on the first and second calculated values.

* * * * *